United States Patent
Xu et al.

(10) Patent No.: US 11,546,058 B1
(45) Date of Patent: Jan. 3, 2023

(54) SYSTEMS AND METHODS FOR CHROMATIC DISPERSION PRE-COMPENSATION

(71) Applicant: CABLE TELEVISION LABORATORIES, INC., Louisville, CO (US)

(72) Inventors: Mu Xu, Broomfield, CO (US); Zhensheng Jia, Superior, CO (US); Haipeng Zhang, Broomfield, CO (US); Luis Alberto Campos, Superior, CO (US); Junwen Zhang, Broomfield, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 0 days.

(21) Appl. No.: 17/162,838

(22) Filed: Jan. 29, 2021

Related U.S. Application Data (60) Provisional application No. 62/967,122, filed on Jan. 29, 2020.

(51) Int. Cl.
| | | |
|---|---|---|
| H04B 10/2513 | (2013.01) | |
| H04B 10/548 | (2013.01) | |
| H04B 10/50 | (2013.01) | |

(52) U.S. Cl.
CPC ..... *H04B 10/25137* (2013.01); *H04B 10/503* (2013.01); *H04B 10/548* (2013.01)

(58) Field of Classification Search
CPC ............ H04B 10/25137; H04B 10/503; H04B 10/548

USPC ......................................................... 398/193
See application file for complete search history.

(56) References Cited

U.S. PATENT DOCUMENTS

| | | | |
|---|---|---|---|
| 5,115,440 A | 5/1992 | Gysel et al. | |
| 5,373,382 A * | 12/1994 | Pirio ................ | H04B 10/25137 385/27 |
| 5,691,989 A | 11/1997 | Rakuljic et al. | |
| 5,699,179 A | 12/1997 | Gopalakrishnan | |
| 5,761,638 A | 6/1998 | Knittle et al. | |
| 5,793,512 A * | 8/1998 | Ryu ................... | H04B 10/2935 398/180 |
| 5,974,209 A | 10/1999 | Cho et al. | |
| 5,991,323 A | 11/1999 | Adams et al. | |
| 7,023,601 B2 * | 4/2006 | McGhan .............. | H04B 10/505 359/278 |
| 7,848,661 B2 | 12/2010 | Iannelli | |
| 8,027,593 B2 | 9/2011 | Zhou et al. | |
| RE44,647 E | 12/2013 | Iannelli | |

(Continued)

FOREIGN PATENT DOCUMENTS

| | | | |
|---|---|---|---|
| JP | H09504673 A | * | 5/1997 |
| JP | H10512124 A | * | 11/1998 |

*Primary Examiner* — Abbas H Alagheband
(74) *Attorney, Agent, or Firm* — PdZ Patent Law, PLLC (57) ABSTRACT

A method for chromatic dispersion pre-compensation in an optical communication network includes (1) distorting an original modulated signal according to an inverse of a transmission function of the optical communication network, to generate a compensated signal, (2) modulating a magnitude of an optical signal in response to a magnitude of the compensated signal, and (3) modulating a phase of the optical signal, after modulating the magnitude of the optical signal, in response to a phase of the compensated signal.

19 Claims, 10 Drawing Sheets

(56) References Cited

U.S. PATENT DOCUMENTS

| | | | |
|---|---|---|---|
| 8,718,484 B2 * | 5/2014 | Dallesasse | H04B 10/504 398/186 |
| 8,909,061 B1 * | 12/2014 | Varadarajan | H04B 10/6161 398/210 |
| 9,559,778 B2 * | 1/2017 | McNicol | H04B 10/07951 |
| 9,941,974 B2 * | 4/2018 | Yu | H04B 10/612 |
| 2005/0281298 A1 | 12/2005 | Kupershmidt et al. | |
| 2006/0078336 A1 * | 4/2006 | McNicol | H04B 10/25137 398/147 |
| 2006/0078338 A1 | 4/2006 | Johnson et al. | |
| 2006/0210282 A1 | 9/2006 | Iannelli | |
| 2008/0193144 A1 | 8/2008 | Zhou et al. | |
| 2009/0110408 A1 * | 4/2009 | Dallesasse | H04B 10/588 398/188 |
| 2009/0123153 A1 * | 5/2009 | Edirisinghe | H04J 14/02 398/81 |
| 2010/0034542 A1 * | 2/2010 | Armstrong | H04B 10/548 398/158 |
| 2010/0128744 A1 * | 5/2010 | Deladurantaye | H01S 3/06754 372/6 |
| 2011/0261845 A1 | 10/2011 | Ishaug | |
| 2013/0136449 A1 * | 5/2013 | Liu | H04B 10/25137 398/147 |
| 2013/0272719 A1 * | 10/2013 | Yan | H04L 25/0202 398/159 |
| 2014/0056583 A1 * | 2/2014 | Giddings | H04L 27/2697 398/79 |
| 2014/0369694 A1 * | 12/2014 | Turitsyn | H04B 10/25133 398/159 |
| 2015/0104196 A1 | 4/2015 | Bae et al. | |
| 2016/0308664 A1 * | 10/2016 | Ishaug | H04L 7/0075 |
| 2017/0180055 A1 * | 6/2017 | Yu | H04J 14/06 |
| 2018/0076887 A1 * | 3/2018 | Roberts | H04B 10/508 |
| 2019/0074846 A1 * | 3/2019 | Hamzeh | H04L 12/2885 |
| 2020/0099449 A1 * | 3/2020 | Way | H04B 10/541 |

* cited by examiner

SYSTEMS AND METHODS FOR CHROMATIC DISPERSION PRE-COMPENSATION

RELATED APPLICATIONS

This application claims benefit of priority to U.S. Provisional Patent Application Ser. No. 62/967,122, filed on Jan. 29, 2020, which is incorporated herein by reference.

BACKGROUND

Communication network traffic continues to grow, such as due to emergence of new services with high bandwidth demand, including data center interconnection services, fifth generation (5G) wireless broadband services, and virtual reality services. Optical communication networks, which use an optical cable to transmit data between network nodes, are increasingly being used for data transmission, due to their inherent capability to support high bandwidth and to transport data over long distances.

DETAILED DESCRIPTION OF THE EMBODIMENTS

One promising communication network architecture for meeting growing data transmission needs is an optical communication network including single-polarized direct-detected (DD) high speed transceivers and implementing wavelength division multiplexing. This communication network architecture is relatively simple and economical compared to other optical communication network architectures, which makes it a strong candidate for many communication network applications.

Figure 1:
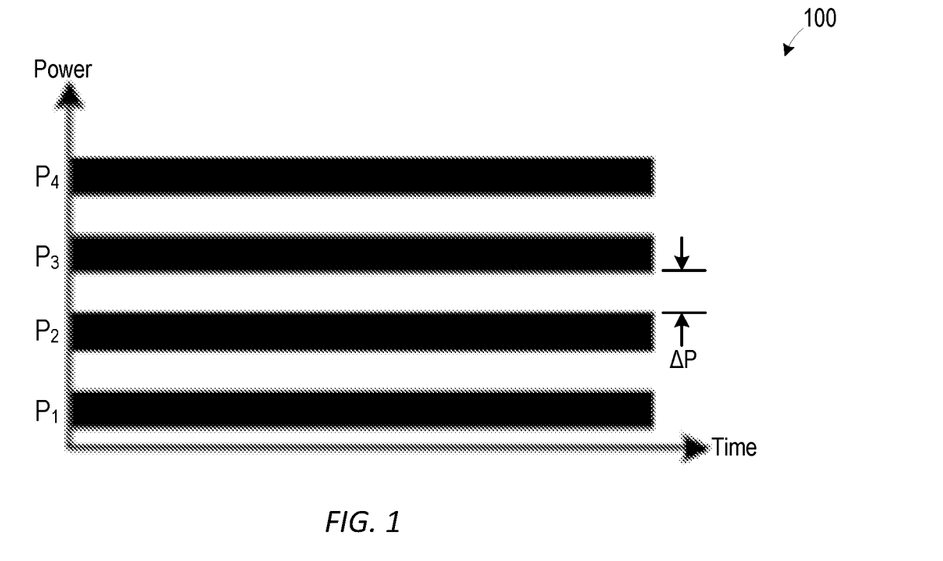
FIG. 1 is a graph of power versus time of a transmitting laser of a simulated optical communication network.
Figure 2:
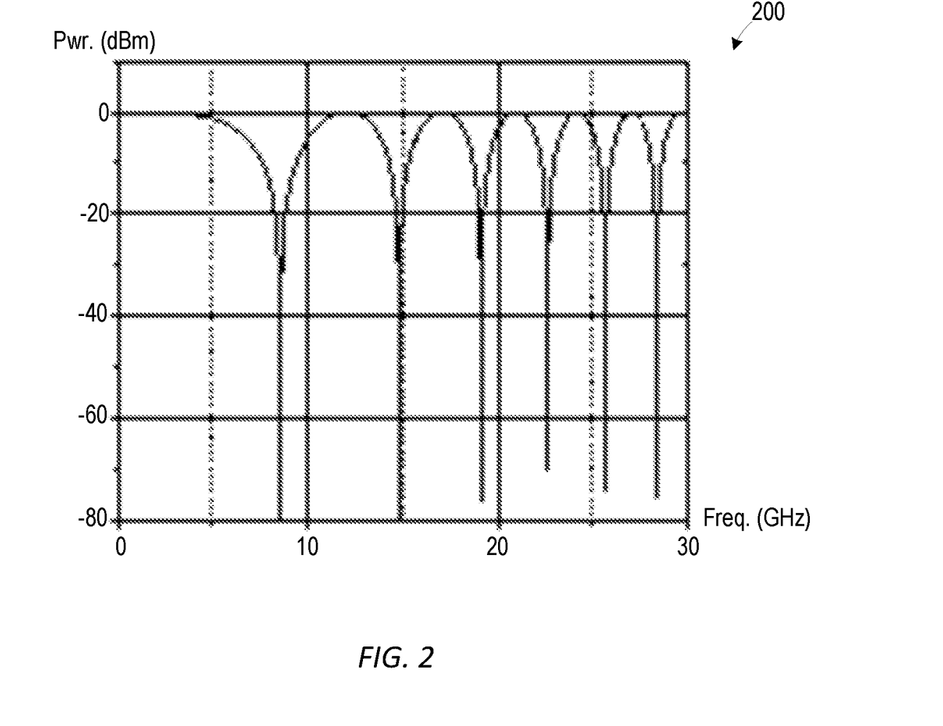
FIG. 2 is a graph of power versus frequency of a signal of the simulated optical communication network after transmission of the signal via an optical cable and detection of the signal by a receiver.

However, conventional long distance communication networks including DD high speed transceivers suffer from chromatic dispersion (CD) induced power fading, which significantly limits bandwidth and maximum optical cable distance. Chromatic dispersion is a phenomenon where different wavelengths of light traveling through an optical cable arrive at a common destination at different times. To help understand the effects of chromatic dispersion on an optical communication network, consider FIGS. 1-5, which are based on a simulated optical communication network using DD transceivers and implementing four levels of pulse-amplitude-modulation (PAM4). FIG. 1 is a graph 100 of power versus time of a transmitting laser of the simulated optical communication network, illustrating that the laser has four possible power output levels, $P_1$, $P_2$, $P_3$, and $P_4$. Each output power level is offset from an adjacent power level by a difference in power of $\Delta P$. FIG. 2 is a graph 200 of power versus frequency of a signal of the simulated optical communication network, after transmission of the signal via an optical cable and detection of the signal by a receiver. As evident from FIG. 2, the received signal does not have a flat response but instead has notches at several frequencies. The notches are caused by chromatic dispersion of the signal when traveling through the optical cable.

Figure 3:
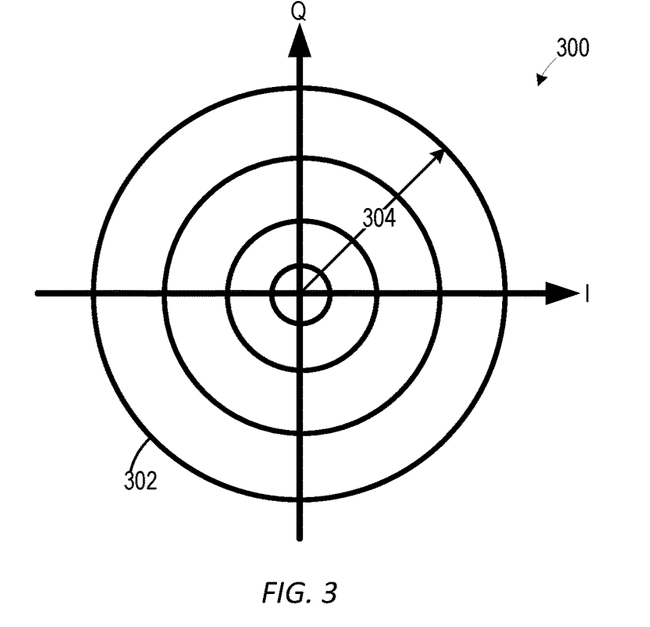
FIG. 3 illustrates possible distributions of a received signal in the simulated optical communication network.

The received signal in the simulated communication network has a complex value which can be represented by a graph 300 of FIG. 3, which illustrates possible distributions of the received signal in an in-phase (I) plane and a quadrature (Q) plane. The received signal can be located at any position on any one of four rings 302, depending on its amplitude and phase. Only one instance of ring 302 is labeled in FIG. 3 for illustrative clarity. It should be noted that while adjacent power outputs of the laser are offset by a uniform difference in power of $\Delta P$, as illustrated in FIG. 1, adjacent amplitude levels are offset by non-uniform differences in amplitude, as illustrated in FIG. 3 by separation of adjacent rings 302 in a radial 304 direction being non-uniform. This non-uniformity of radial 304 separation of rings 302 results from the relationship between signal power and amplitude, where signal amplitude is the square root of signal power.

Figure 4:
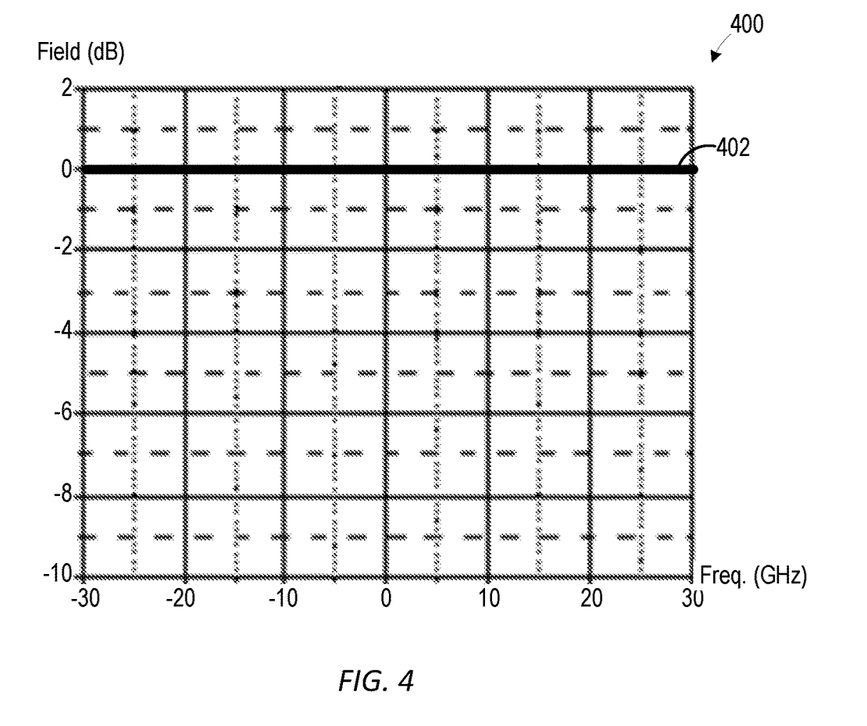
FIG. 4 is a graph of optical field amplitude of a signal in the simulated optical communication network after transmission through the network.
Figure 5:
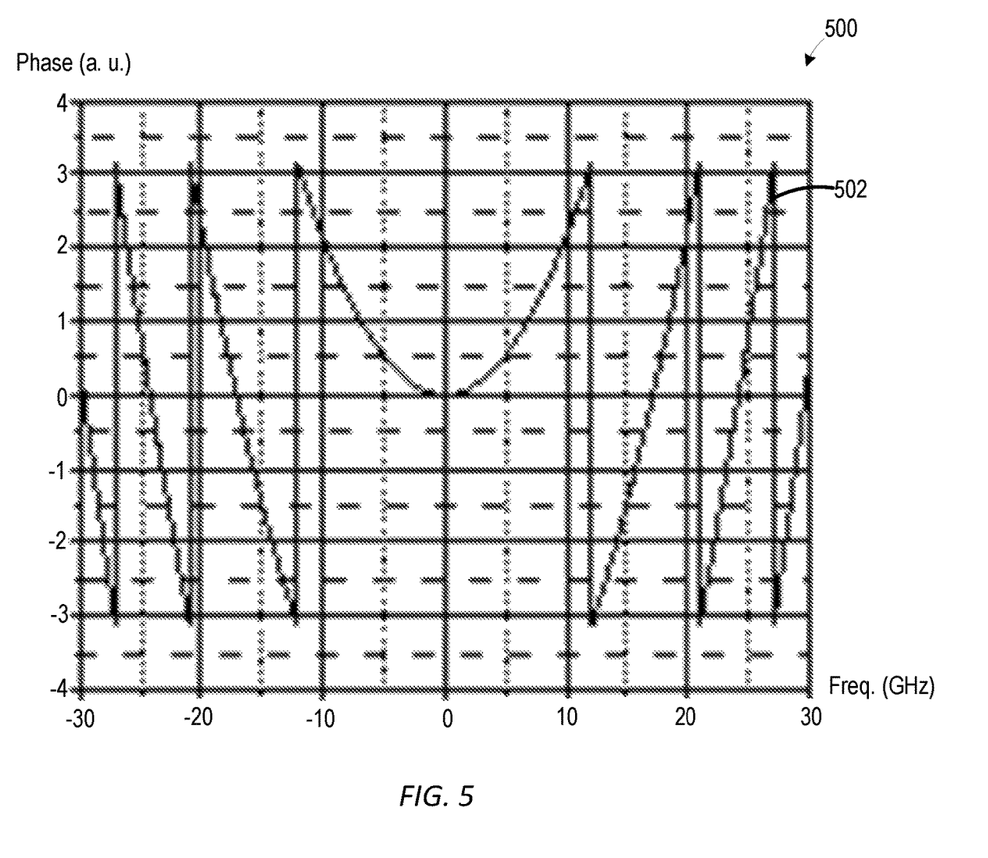
FIG. 5 is a graph of optical field phase of a signal in the simulated optical communication network after transmission through the network.

FIG. 4 is a graph 400 of optical field amplitude, and FIG. 5 is a graph 500 of optical field phase in arbitrary units (a.u.), of a signal in the simulated optical communication network after transmission through the network. A curve 402 of FIG. 4 illustrates that the amplitude is flat, i.e., that the amplitude of the transmitted signal does not materially vary with frequency. A curve 502 of FIG. 5, in contrast, illustrates that phase of the transmitted signal varies significantly with frequency, due to chromatic dispersion in the optical cable. Accordingly, chromatic dispersion causes the optical cable to behave like an all-pass filter, which does not directly affect signal amplitude but significantly affects signal phase, as illustrated in FIGS. 4 and 5. While the distortion in phase caused by chromatic distortion does not directly affect signal amplitude, the distortion in phase affects signal power, as illustrated in FIG. 2.

Effects of chromatic dispersion on a transmitted signal may make it difficult, or even essentially impossible, to recover information, such as a payload, from the signal. Single-side band (SSB) modulation may be used to mitigate effects of chromatic dispersion, and use of SSB modulation may therefore extend maximum transmission distance of an optical communication network. Nevertheless, SSB modulation does not eliminate power fading caused by chromatic dispersion, and SSB modulation leads to signal-to-signal beating interference (SSBI), which degrades signal quality. Additionally, SSB modulation reduces receiving sensitivity from loss of power associated with eliminating one side band. Chromatic dispersion can also be mitigated by pre-compensation at a transmitter-side IQ-modulator, but this pre-compensation scheme induces high insertion loss and requires complex and costly bias control.

Disclosed herein systems and methods for chromatic dispersion pre-compensation (CDPC) which at least partially overcome drawbacks of conventional techniques for mitigating chromatic dispersion. Certain embodiments include a phase modulator (PM) and a cascaded directly-modulated laser (DML), or a coherent optical injection locking (COIL) laser, to realize full-field light modulation. The new systems and methods achieve chromatic pre-compensation by a combination of intensity and phase modulations, thereby potentially significantly extending maximum communication system transmission distance, while achieving significant advantages. For example, use of a phase modulator to achieve phase modulation, instead of an IQ-modulator, relaxes bias control requirements and reduces insertion losses. Additionally, a low-cost, intensity-modulated distributed feedback (DFB) laser can be used as a light source in the new systems. Accordingly, the new systems and methods may be more economical and more efficient than conventional systems and methods. Additionally, the new systems and methods are compatible with optical injection locking subsystems. Moreover, the new systems and methods may extend usable transmission light wavelengths when used in passive optical network (PON) applications. Specifically, a PON is typically configured such that uplink transmission light wavelength is limited to the O band (1260-1360 nm), to avoid chromatic dispersion penalties. Use of the new systems and methods in a PON, however, may sufficiently mitigate chromatic dispersion such that additional bands, such as the C band, can be used, thereby significantly expanding PON capacity and/or flexibility.

Figure 6:
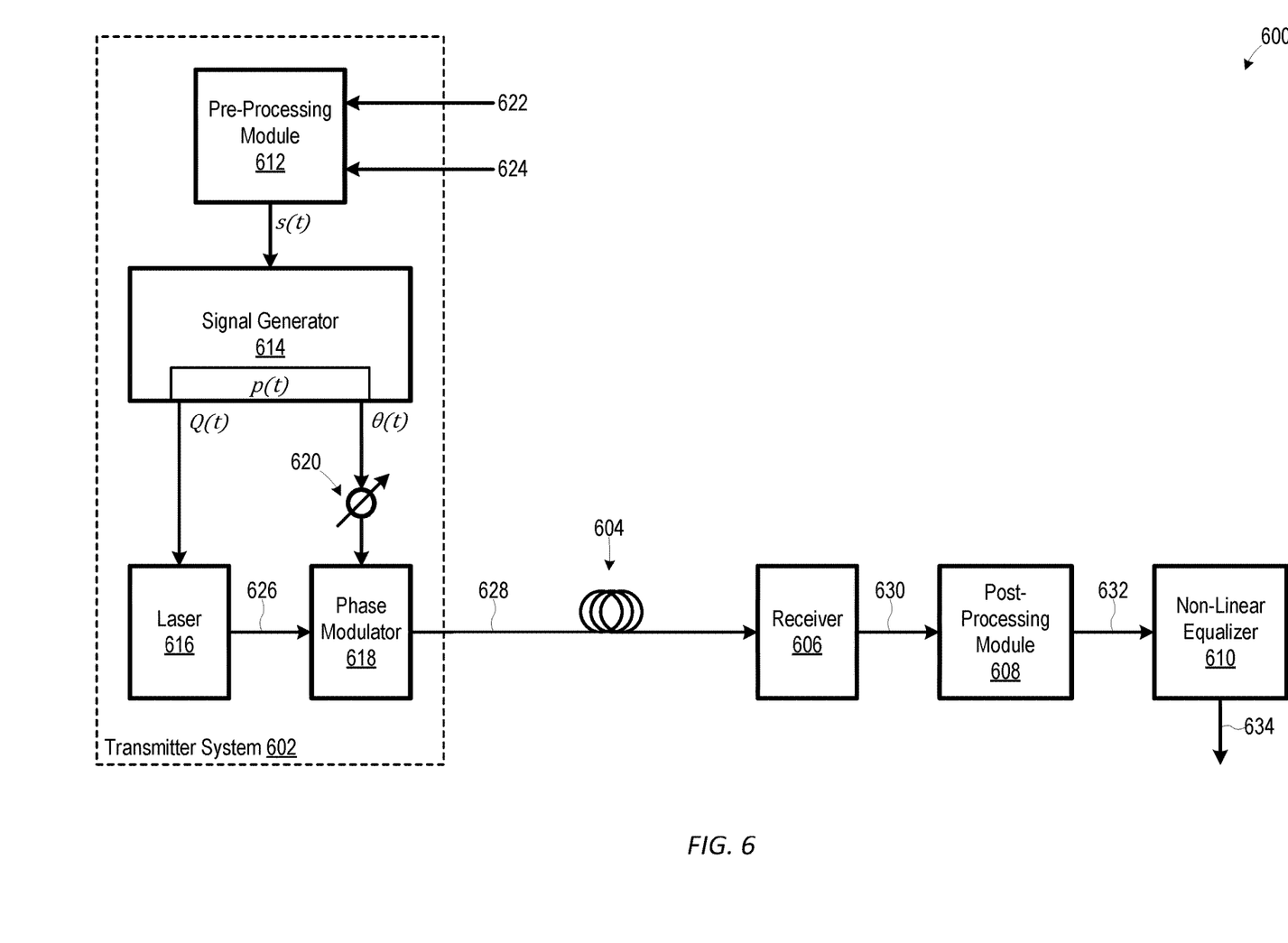
FIG. 6 is a block diagram of an optical communication network including a transmitter system configured to implement chromatic dispersion pre-compensation, according to an embodiment.

FIG. 6 is a block diagram of an optical communication network 600 including a transmitter system 602 configured to implement chromatic dispersion pre-compensation, as well as an optical cable 604, a receiver 606, a post-processing module 608, and an optional non-linear equalizer 610. Optical cable 604 communicatively couples transmitter system 602 and receiver 606, and post processing module 608 is communicatively coupled to an output of receiver 606. Optional non-linear equalizer 610, when present, is communicatively coupled to an output of post processing module 608. Optical cable 628 could be replaced with a free-space optical transmission system without departing from the scope hereof.

Transmitter system 602 includes a pre-processing module 612, a signal generator 614, a laser 616, a phase modulator 618, and a tunable delay line 620. Although the elements of transmitter system 602 are illustrated as being separate elements, two or more of these elements could be at least partially combined without departing from the scope hereof. For example, in some embodiments, pre-processing module 612 and signal generator 614 are embodied by a common processor executing instructions in the form of software and/or firmware. Additionally, all elements of transmitter system 602 need not be disposed in the same location. For example, pre-processing module 612 and signal generator 614 could be remote from laser 616 and phase modulator 618.

Pre-processing module 612 is configured to module modulate a carrier signal 622 by an input signal 624 to be transmitted by optical communication network 600 to generate an original modulated signal s(t). For example, some embodiments of pre-processing module 612 are configured to modulate solely amplitude of carrier signal 622, such as by using a non-return-to-zero (NRZ) modulation format or a PAM4 modulation format. As another example, some embodiments of pre-processing module 612 are configured to modulate both amplitude and phase of carrier signal 622, such as by using a quadrature phase shift keying (QPSK) modulation format or a 16-order quadrature amplitude modulation (16-QAM) modulation format. Signal generator 614 is configured to distort original modulated signal s(t) according to an inverse of a transmission function H of optical communication network 600, to generate a compensated signal p(t), which has an amplitude Q(t) and a phase θ(t). Transmission function H includes effects of chromatic dispersion by optical cable 604. Therefore, distorting original modulated signal s(t) according to an inverse of transmission function H advantageously at least substantially compensates for the chromatic dispersion, such that a signal received by receiver 606 will be at least substantially free of chromatic dispersion artifacts. Such intentional distortion of original modulated signal s(t) to compensate for chromatic dispersion in optical cable 604 may be referred to a "pre-compensation," since signals are compensated for chromatic dispersion before being transmitted through optical cable 604. In some embodiments, transmission function H may be determined from length and material of optical cable 604, such that transmission function H is static. In some other embodiments, transmission function His determined in real time, or on a periodic basis, such that transmission function His dynamic. Several possible embodiments of signal generator 614 are discussed below with respect to FIGS. 7-9.

Signal generator 614 provides amplitude Q(t) of compensated signal p(t) to laser 616, and signal generator 614 provides phase θ(t) of compensated signal p(t) to phase modulator 618. Laser 616 is configured to generate an optical signal 626 and modulate amplitude of optical signal 626 in response to amplitude Q(t) of compensated signal p(t), such that laser 616 is controlled by amplitude Q(t). Accordingly, optical signal 626, as outputted by laser 616, includes amplitude information, but the optical signal does not include phase information. In some embodiments, laser 616 a directly-modulated laser (DML) or a coherent optical injection locking (COIL) laser.

Phase modulator 618 is located downstream of laser 616 with respect to optical signal 626, and phase modulator 618 is configured to modulate a phase of optical signal 626 in response to a phase θ(t) of compensated signal p(t), to generate an optical signal 628 for transmission by optical cable 604 to receiver 606. Optical signal 628 includes both amplitude and phase information. It may be necessary for respective clocks of laser 616 and phase modulator 618 to be synchronized, or in other words, for the two clocks to match. Accordingly, some embodiments of transmitter system 602 include tunable delay line 620 configured to synchronize the clock of phase modulator 618 with the clock of laser 616, by adding a delay to phase θ(t) of compensated signal p(t), before phase modulator 618 modulates phase of optical signal 626 according to phase θ(t).

Optical cable 604 is configured to transmit optical signal 628 from phase modulator 618 to receiver 606, and receiver 606 is configured to convert optical signal 628 into an electrical signal 630. Post-processing module 608 is configured to recover input signal 624 from electrical signal 630 and thereby generate an output signal 632, such as by performing a demodulation technique appropriate for modulation performed by pre-processing module 612. In the event that there is non-linear distortion on output signal 632, such as caused by pre-compensation performed by transmitter system 602, optional non-linear equalizer 610 may be used to perform non-linear equalization of output signal 632 to generate a corrected output signal 634.

Possible applications of optical communication network 600 including transmitting data over a short distance, a medium distance, or a long distance. For example, optical communication network 600 could be used to transmit data within a data center, within a building, or even within a single networking appliance. As another example, optical communication network 600 could be part of an access network, including but not limited to, a PON. As yet another example, optical communication network 600 could be part of a long distance data transmission network.

Figure 7:
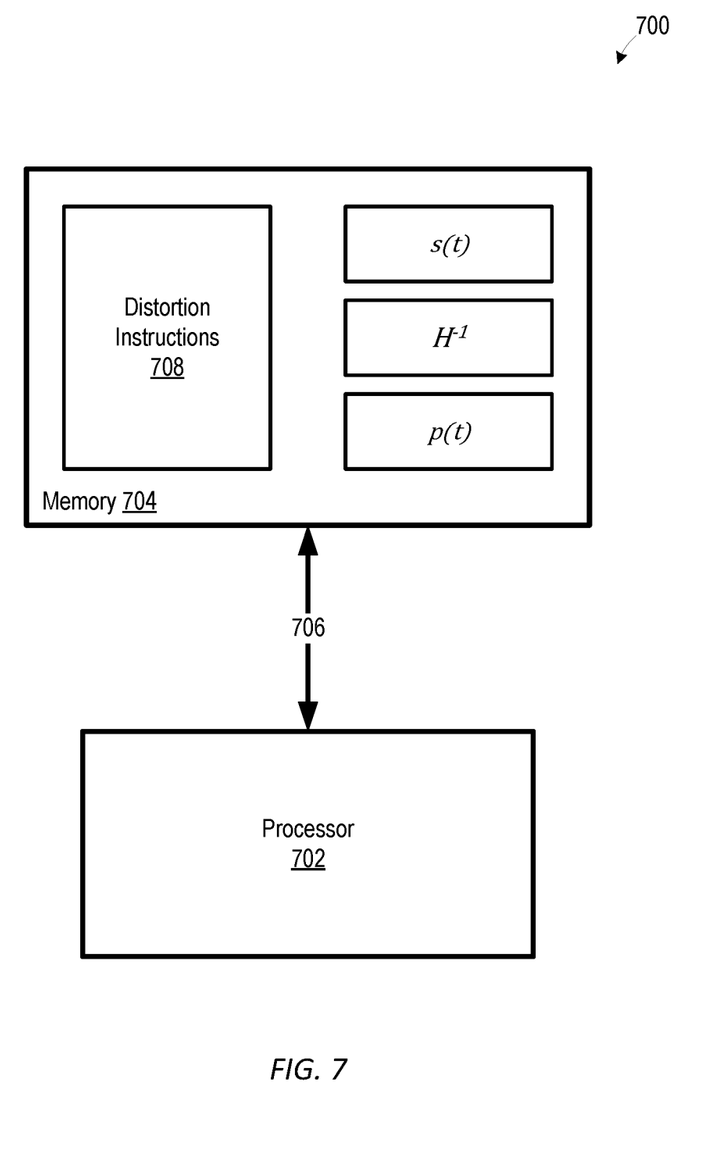
FIG. 7 is a block diagram of one possible embodiment of a signal generator of the FIG. 6 optical communication network.

FIG. 7 is a block diagram of a signal generator 700, which is one possible embodiment of signal generator 614 of FIG. 6, although it is understood that signal generator 614 is not limited to the FIG. 7 embodiment. Signal generator 700 includes a processor 702, a memory 704, and a communication bus 706 communicatively coupling processor 702 and memory 704. Memory 704 includes distortion instructions 708 in the form of software and/or firmware. Memory 704 also holds a copy of each of original modulated signal s(t), an inverse $H^{-1}$ of the network transmission function H, and compensated signal p(t). Processor 702 is configured to execute instructions 708 to generate compensated signal p(t) from original modulated signal s(t) and inverse $H^{-1}$ of the network transmission function H In some embodiments, instructions 708 are configured such that processor 702 generates compensated signal p(t) according to a method illustrated in FIG. 8 or a method illustrated in FIGS. 9A-9F (discussed below). Processor 702 may be configured to perform additional functions without departing from the scope hereof. For example, in some embodiments, memory 704 includes additional instructions (not shown) for processor 702 to generate original modulated signal s(t), such that signal generator 700 embodies pre-processing module 612 as well as signal generator 614.

Figure 8:
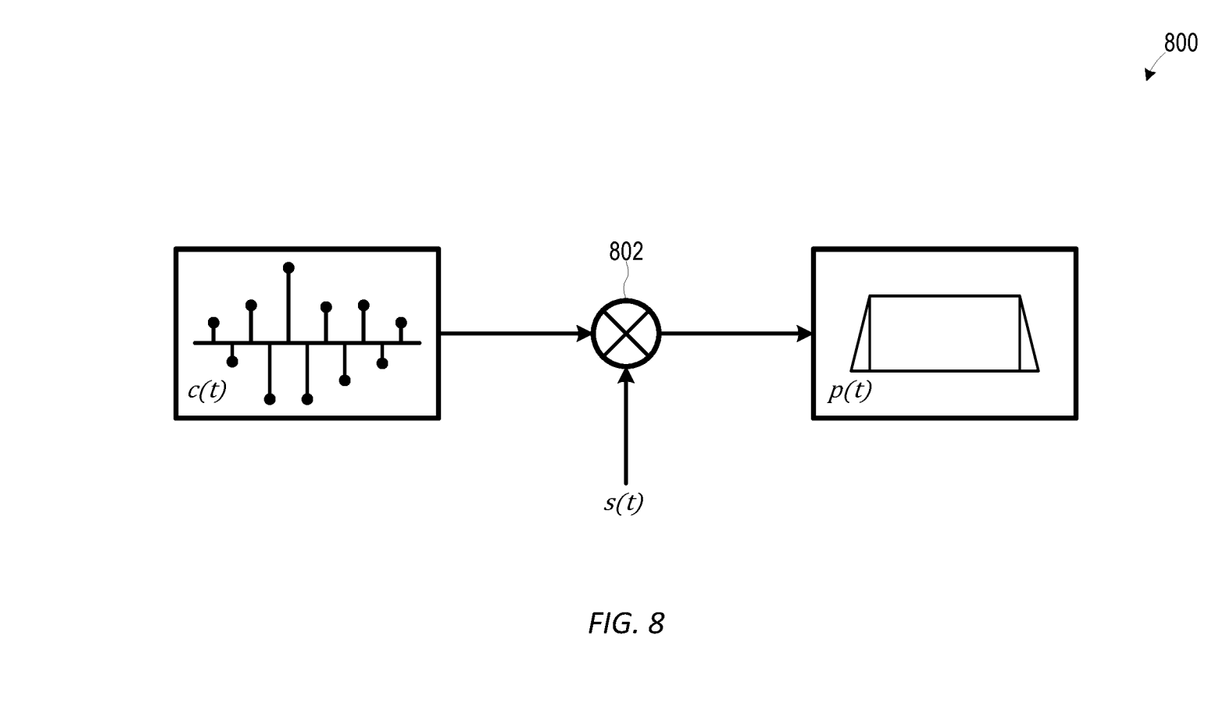
FIG. 8 is a block diagram illustrating a method performed by some embodiments of the signal generator of the FIG. 6 optical communication network for generating a compensated signal.

FIG. 8 is a block diagram 800 illustrating a method performed by some embodiments of signal generator 614 to generate compensated signal p(t). In the method illustrated in FIG. 8, signal generator 614 determines a time domain filter function c(t) by converting the inverse $H^{-1}$ of the network transmission function H from the frequency domain to the time domain, such as by using an inverse fast Fourier transform (ifft) method. Signal generator 614 then convolves 802 original modulated signal s(t) with time domain filter function c(t) to generated compensated signal p(t). The method illustrated in FIG. 8 may be practical to implement in applications where a required number of taps in time domain filter function c(t) is less than 20, which is common in applications where optical cable 604 is relatively short, such as less than or equal to 40 Kilometers (Km). However, the FIG. 8 method may not be practical to implement in applications requiring a larger number of taps, due to large memory requirements and high computation complexity associated with convolution operation 802.

Figure 9A:
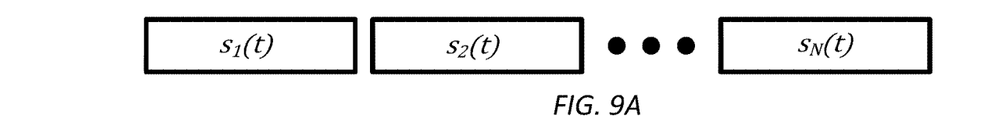
FIGS. 9A-9F are block diagrams collectively illustrating a method performed by some other embodiments of the signal generator of the FIG. 6 optical communication network for generating a compensated signal.
Figure 9B:
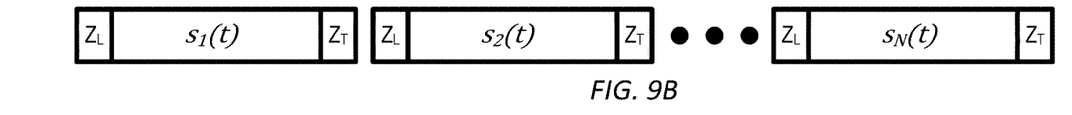
Figure 9C:
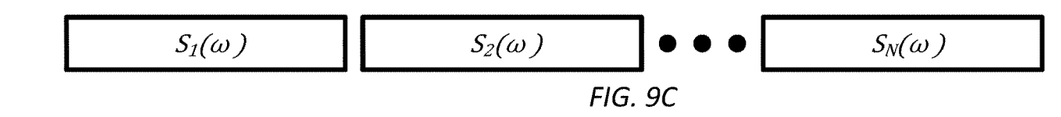
Figure 9D:
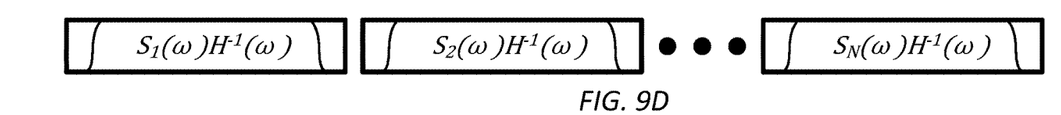
Figures 9E, 9F:
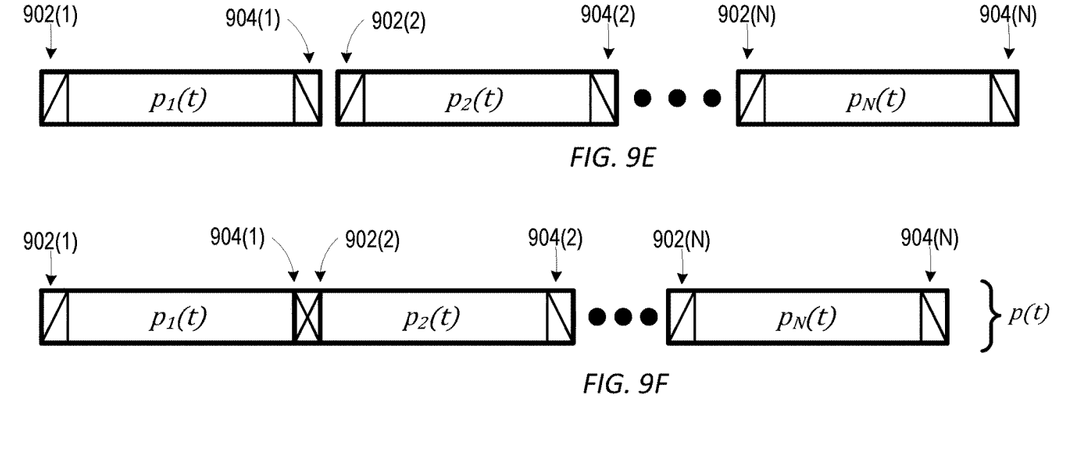

FIGS. 9A-9F are block diagrams collectively illustrating a method performed by some other embodiments of signal generator 614 to generate compensated signal p(t). The method begins with signal generator 614 dividing original modulated signal s(t) into N blocks $s_k(t$, as illustrated in FIG. 9A, where N is an integer greater than one and k is an index ranging from 1 to N. Signal generator 614 then adds leading zeros $Z_L$ and trailing zeros $Z_T$ to each block $s_k(t$, as illustrated in FIG. 9B. Signal generator 614 next converts each block $s_k(t)$ from a time domain to a frequency domain, such as by using a fast Fourier transform (FFT) technique, to generate frequency domain blocks $S_k(\omega)$, as illustrated in FIG. 9C. Signal generator 614 subsequently multiplies each frequency domain block $S_k(\omega)$ by the inverse $H^{-1}(\omega)$ of the network transmission function H to obtain frequency domain filtered blocks $S_k(\omega)^{-1}(\omega)$, as illustrated in FIG. 9D. Each frequency domain filtered block $S_k(\omega)H^{-1}(\omega)$ is subsequently converted to the time domain by signal generator 614 to yield time domain filtered blocks $p_k(t)$, as illustrated in FIG. 9E, such as by using an inverse fast Fourier transform technique.

Each time domain filtered blocks $p_k(t)$ includes a respective damping tail at the beginning and end of the block, caused by pulse expansion from the chromatic dispersion pre-compensation process. The leading and trailing zeros discussed above help mitigate effects of the damping tails, such that each damping tail is at least substantially encompassed by leading zeros or trailing zeros. Time domain filtered blocks $p_k(t)$ are labeled in FIG. 9E to show portions 902 associated with leading zeros and portions 904 associated with trailing zeros. In this document, specific instances of an item may be referred to by use of a numeral in parentheses (e.g. portion 902(1)) while numerals without parentheses refer to any such item (e.g. portions 902). Signal generator 614 subsequently partially overlaps and sums time domain filtered blocks $p_k(t)$ to obtain compensated signal p(t), as illustrated in FIG. 9F. Signal generator 614 overlaps time domain filtered blocks $p_k(t)$ such that for each pair of immediately adjacent time domain filtered blocks $p_k(t)$, a portion 904 of a first block of the pair associated with trailing zeros overlaps a portion 902 of a second block of the pair associated with leading zeros. For example, in pair of immediately adjacent time domain filtered blocks $p_1(t)$ and $p_2(t)$, portion of 904(1) of block $p_1(t)$ associated with trailing zeros overlaps portion 902(2) of block $p_2(t)$ associated with leading zeros.

The method illustrated in FIGS. 9A-9F may be more computationally efficient than the method illustrated in FIG. 8, and the method of FIGS. 9A-9F may therefore be particularly suitable for embodiments of communication network 600 where length of optical cable 604 is relatively long, such as greater than 40 Km. However, the method of FIGS. 9A-9F is more susceptible to data frame desynchronization than the FIG. 8 method, due to the block-wise signal processing techniques used in the FIGS. 9A-9F method.

Figure 10:
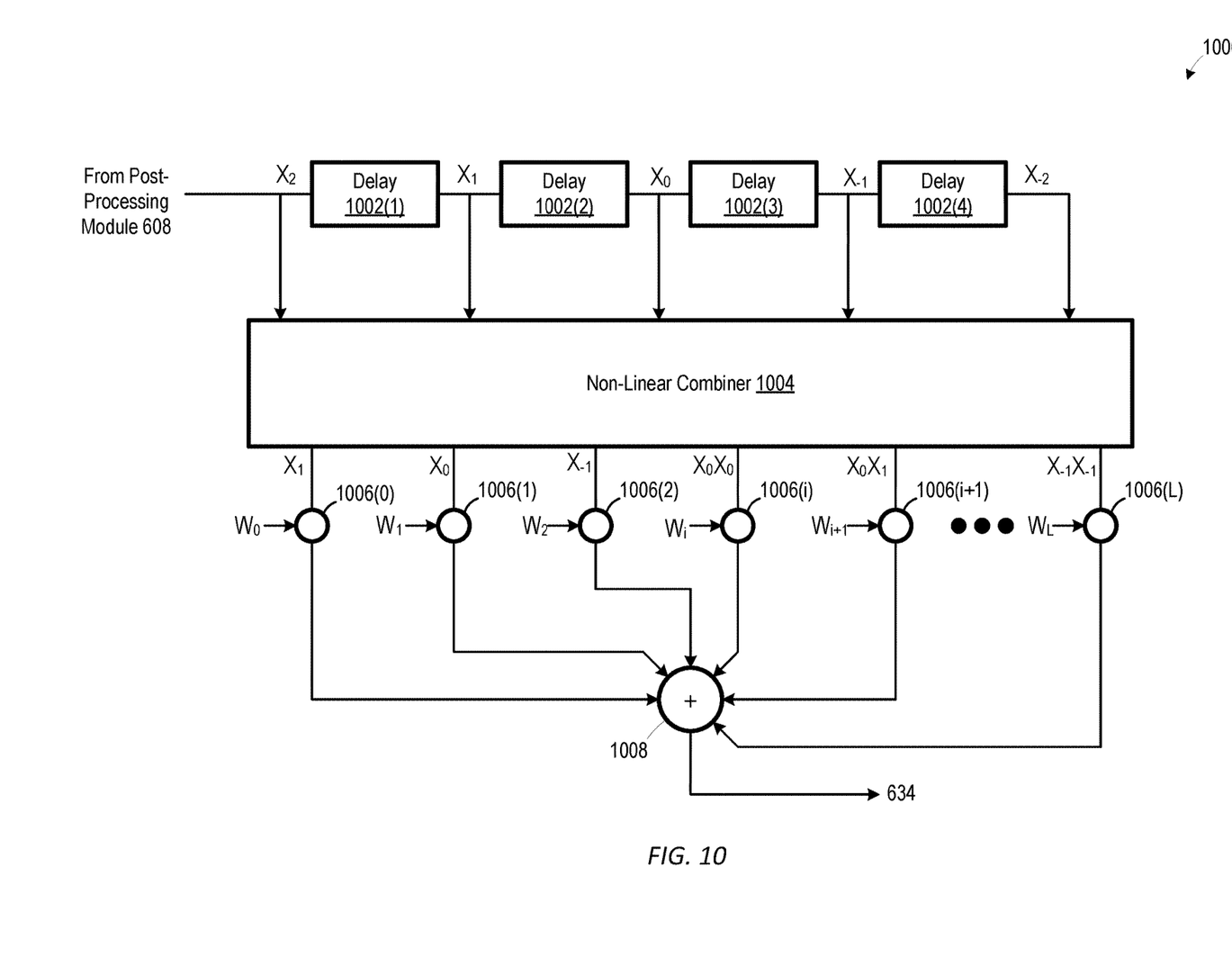
FIG. 10 is a block diagram of one possible embodiment of a non-linear equalizer of the FIG. 6 optical communication network.

FIG. 10 is a block diagram of a non-linear equalizer 1000, which is one possible embodiment of non-linear equalizer 610 of FIG. 6. Non-linear equalizer 1000 has a Volterra non-linear equalizer architecture and includes a plurality of delay taps 1002, a nonlinear combiner 1004, a plurality of tap weight modules 1006, and an addition module 1008. Tap weight modules 1006 are optionally adjusted to minimize a mean-square error between transmitted symbols and received symbols after digital filtering. In some embodiments, the elements of non-linear equalizer 1000 are embodied by a processor (not shown) executing instructions in the form of software and/or firmware stored in a memory (not shown).

Example Simulation Results

Figure 11:
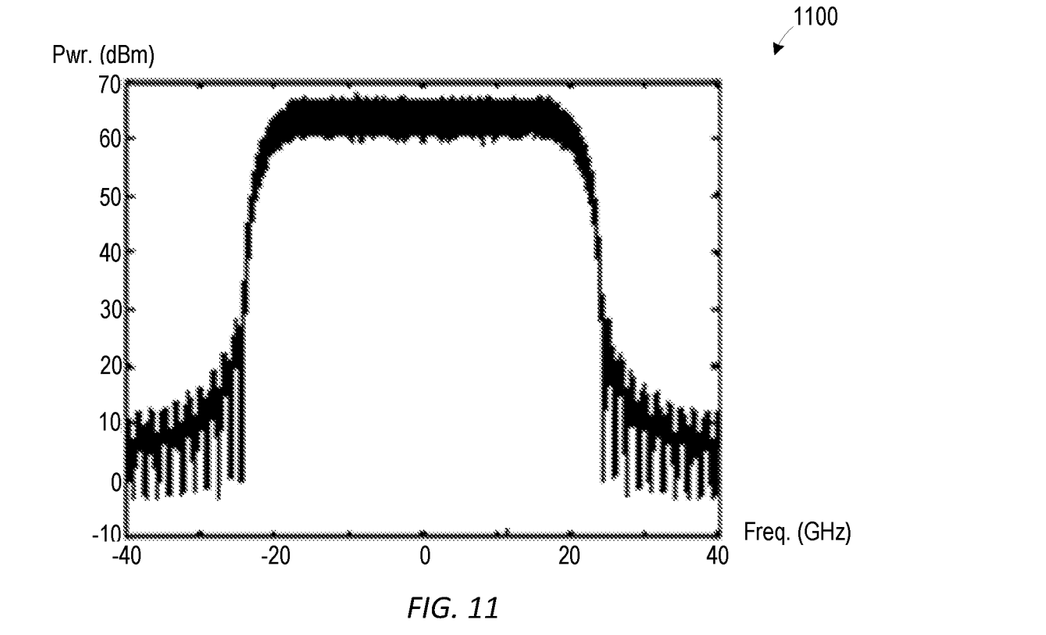
FIG. 11 is a graph of simulated signal power magnitude versus frequency of an original modulated signal of an embodiment of the FIG. 6 communication network.
Figure 12:
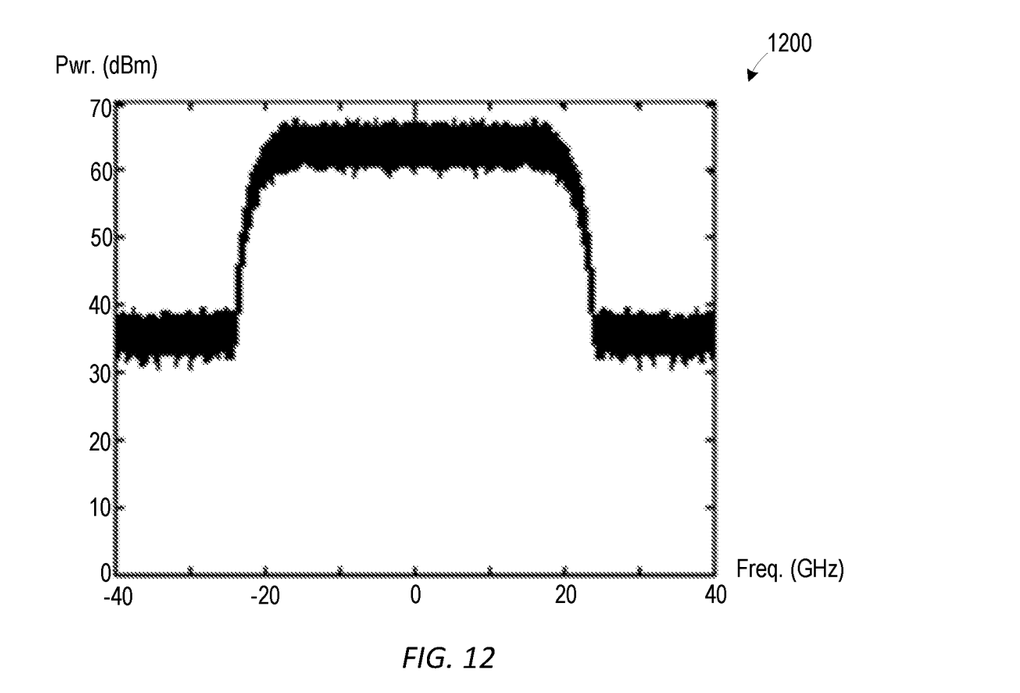
FIG. 12 is a graph of simulated signal power magnitude versus frequency of an output electrical signal of an embodiment of the FIG. 6 communication network.
Figure 13:
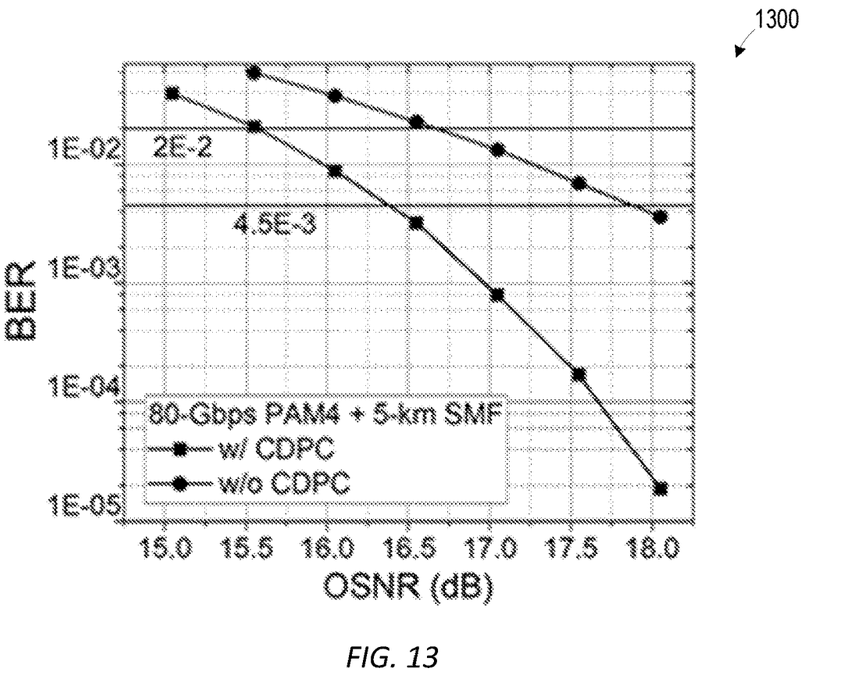
FIG. 13 is a graph of a bit error rate versus optical signal to noise ratio of two communication networks.

Discussed below with respect to FIGS. 11-13 are simulation results of several embodiments of communication network 600. It is appreciated, though, that communication network 600 need not necessarily perform as indicated in these simulation results. To the contrary, performance of communication network 600 will vary depending on the specific configuration and operating conditions of the communication network.

FIG. 11 is a graph 1100 of simulated signal power magnitude versus frequency of original modulated signal s(t), and FIG. 12 is a graph 1200 of simulated signal power magnitude versus frequency of output electrical signal 630 from receiver 606. In these simulations, pre-processing module 612 is configured to modulate carrier signal 622 at a rate of 40 Giga Baud (GBaud) per second, optical cable 604 is a five Kilometer long single-mode fiber optical cable, and (c) signal generator 614 is configured to implement the method illustrated in FIGS. 9A-9F. It should be appreciated that the response of FIG. 12 has a similar shape to that of FIG. 11, thereby showing that this embodiment of communication network 600 compensates for chromatic distortion. The performance of communication network 600 can be further appreciated by comparing FIG. 12 to FIG. 2, where the response of FIG. 12 does not include the notches from chromatic dispersion that are present in the FIG. 2 response.

FIG. 13 is a graph 1300 of simulated bit error rate (BER) versus optical signal to noise ratio (OSNR) of two communication networks. The first communication network, corresponding to the curve labeled "w/ CDPC", is an embodiment of communication network 600 where (a) pre-processing module 612 is configured to modulate carrier signal 622 at a rate of 40 GBaud per second using PAM4 and (b) optical cable 604 is five Kilometer long single-mode fiber optical cable. The second communication network, corresponding to the curve labeled "w/o CDPC" is like the embodiment of communication 600 described immediately above but with without CDPC capability. FIG. 13 also includes lines respectively representing BER thresholds of 2E-2 and 4.5E-3. It can be determined from FIG. 13 that a OSNR penalty is improved by 1 dB and 1.5 dB, respectively, by the CDPC capabilities of communication network 600.

Further Examples

Figure 14:
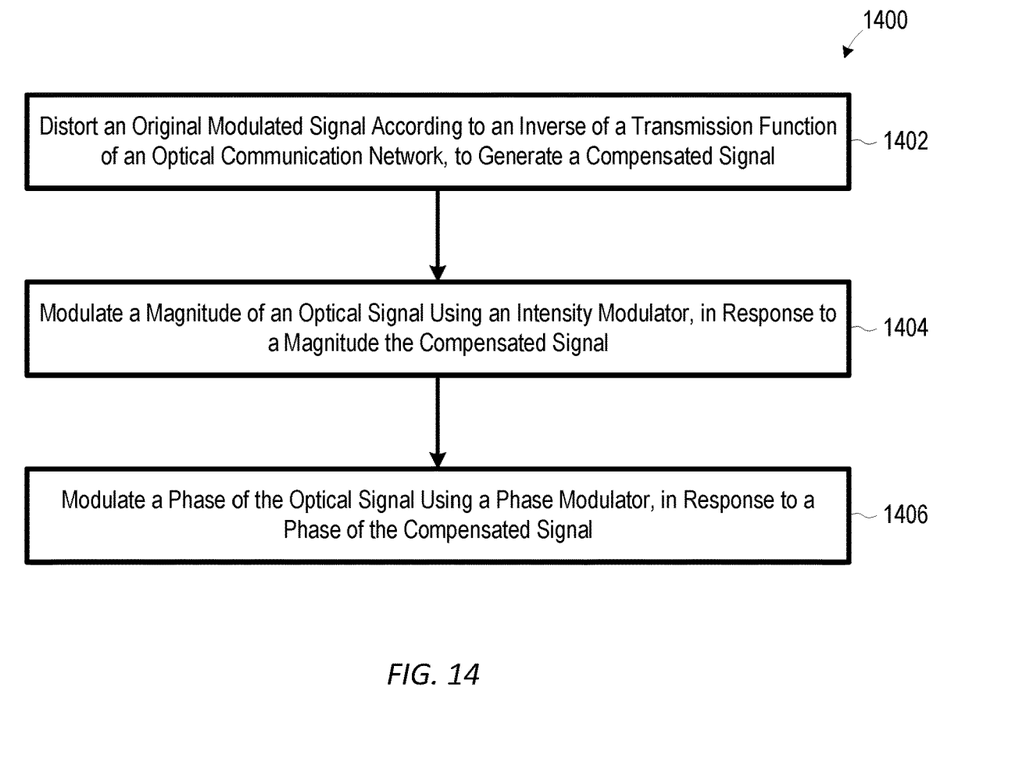
FIG. 14 is a flow chart of a method for chromatic dispersion pre-compensation in an optical communication network.

Discussed below with respect to FIG. 14 are additional examples of operation of communication network 600. It is appreciated however, that communication network 600 is not limited to operating according to these examples.

FIG. 14 is a flow chart of a method 1400 for chromatic dispersion pre-compensation in an optical communication network. In a block 1402 of method 1400, an original modulated signal is distorted according to an inverse of a transmission function of the optical communication network to generate a compensated signal. In one example block 1402, signal generator 614 distorts original modulated signal s(t) according to an inverse of transmission function H to generated compensated signal p(t). In a block 1404 of method 1400, a magnitude of an optical signal is modulated using an intensity modulator, in response to magnitude of the compensated signal. In one example of block 1404, laser 616 modulates a magnitude of optical signal 626 in response to a magnitude Q(t) of compensated signal p(t). In a block 1406 of method 1400, a phase of the optical signal is modulated using a phase modulator, in response to a phase of the compensated signal, after modulating magnitude of the optical signal. In one example of block 1406, phase modulator 618 modulates phase of optical signal 628 in response to phase θ(t) of compensated signal p(t).

Features described above may be combined in various ways without departing from the scope hereof. The following examples illustrate some possible combinations.

(A1) A method for chromatic dispersion pre-compensation in an optical communication network may include (1) distorting an original modulated signal according to an inverse of a transmission function of the optical communication network, to generate a compensated signal, (2) modulating a magnitude of an optical signal in response to a magnitude of the compensated signal, and (3) modulating a phase of the optical signal, after modulating the magnitude of the optical signal, in response to a phase of the compensated signal.

(A2) In the method denoted as (A1), modulating the magnitude of the optical signal in response to the magnitude of the compensated signal may include controlling a laser in response to the magnitude of the compensated signal, and modulating the phase of the optical signal in response to the phase of the compensated signal may include controlling a phase modulator, that is separate from the laser, in response to the phase of the compensated signal.

(A3) In the method denoted as (A2), the laser may be a directly-modulated laser (DML).

(A4) In the method denoted as (A2), the laser may be a coherent optical injection locking (COIL) laser.

(A5) Any one of the methods denoted as (A1) through (A4) may further include matching a clock of the phase modulator with a clock of the laser.

(A6) In the method denoted as (A5), matching the clock of the phase modulator with the clock of the laser may include adding a delay to the phase of the compensated signal, before modulating the phase of the optical signal in response to the phase of the compensated signal.

(A7) In any one of the methods denoted as (A1) through (A6), distorting the original modulated signal according to the inverse of the transmission function of the optical communication network may include convolving the original modulated signal with a time domain filter function.

(A8) The method denoted as (A7) may further include converting the transmission function of the optical communication network from a frequency domain to a time domain, to generate the time domain filter function.

(A9) In any one of the methods denoted (A1) through (A6), distorting the original modulated signal according to the inverse of the transmission function of the optical communication network may include: (1) dividing the original modulated signal into a plurality of blocks, (2) adding leading and trailing zeros to each block, (3) converting each block from a time domain to a frequency domain, (4) after converting each block to the frequency domain, multiplying each block by the inverse of the transmission function of the optical communication network to obtain a respective frequency domain filtered block, (5) converting each frequency domain filtered block to a time domain filtered block, and (6) summing the time domain filtered blocks to obtain the compensated signal.

(A10) The method denoted as (A9) may further include, before summing the time domain filtered blocks to obtain the compensated signal, partially overlapping adjacent time domain filtered blocks in the time domain.

(A11) In the method denoted as (A10), partially overlapping adjacent time domain filtered blocks in the time domain may include overlapping adjacent time domain filtered blocks such that for each pair of immediately adjacent time domain filtered blocks, a portion of a first block of the pair associated with trailing zeros overlaps a portion of a second block of the pair associated with leading zeros.

(A12) Any one of the methods denoted as (A1) through (A11) may further include transmitting the optical signal to a receiver via an optical cable, after modulating the phase of the optical signal.

(A13) The method denoted as (A12) may further include recovering an input signal from the optical signal to generate an output signal.

(A14) The method denoted as (A13) may further include performing non-linear compensation of the output signal.

(B1) A transmitter system configured to perform chromatic dispersion pre-compensation may include (1) a signal generator configured to distort an original modulated signal according to an inverse of a transmission function of an optical communication network, to generate a compensated signal, (2) a laser configured to modulate an amplitude of an optical signal in response to a magnitude of the compensated signal, and (3) a phase modulator disposed downstream of the laser with respect to the optical signal, the phase modulator being configured to modulate a phase of the optical signal in response to a phase of the compensated signal.

(B2) The transmitter system denoted as (B1) may further include a tunable delay line configured to add a delay to the phase of the compensated signal, before the phase modulator modulates the phase of the optical signal in response to the phase of the compensated signal.

(B3) In any one of the transmitter systems denoted as (B1) or (B2), the laser may include a directly-modulated laser (DML).

(B4) In any one of the transmitter systems denoted as (B1) or (B2), the laser may include a coherent optical injection locking (COIL) laser.

(B5) In any one of the transmitter systems denoted as (B1) through (B4), the signal generator may be configured to distort the original modulated signal according to the inverse of the transmission function of the optical communication network by convolving the original modulated signal with a time domain filter function.

(B6) In any one of the transmitter systems denoted as (B1) through (B4), the signal generator may be configured to distort the original modulated signal according to the inverse of the transmission function of the optical communication network by: (1) dividing the original modulated signal into a plurality of blocks, (2) adding leading and trailing zeroes to each block, (3) converting each block from a time domain to a frequency domain, (4) after converting each block to the frequency domain, multiplying each block by the inverse of the transmission function of the optical communication network to obtain a respective frequency domain filtered block, (5) converting each frequency domain filtered block to a time domain filtered block, and (6) summing the time domain filtered blocks to obtain the compensated signal.

Changes may be made in the above methods, devices, and systems without departing from the scope hereof. It should thus be noted that the matter contained in the above description and shown in the accompanying drawings should be interpreted as illustrative and not in a limiting sense. The following claims are intended to cover generic and specific features described herein, as well as all statements of the scope of the present method and system, which as a matter of language, might be said to fall therebetween.

What is claimed is:

1. A method for chromatic dispersion pre-compensation in an optical communication network, comprising:
   distorting an original modulated signal according to an inverse of a transmission function of the optical communication network, at least partially by applying the inverse of the transmission function of the optical communication network to a plurality of blocks derived from the original modulated signal, to generate a compensated signal;
   modulating a magnitude of an optical signal in response to a magnitude of the compensated signal; and
   modulating a phase of the optical signal, after modulating the magnitude of the optical signal, in response to a phase of the compensated signal.

2. The method of claim 1, wherein:
   modulating the magnitude of the optical signal in response to the magnitude of the compensated signal comprises controlling a laser in response to the magnitude of the compensated signal; and
   modulating the phase of the optical signal in response to the phase of the compensated signal comprises controlling a phase modulator, that is separate from the laser, in response to the phase of the compensated signal.

3. The method of claim 2, wherein the laser is a directly-modulated laser (DML).

4. The method of claim 2, wherein the laser is a coherent optical injection locking (COIL) laser.

5. The method of claim 2, further comprising matching a clock of the phase modulator with a clock of the laser.

6. The method of claim 5, wherein matching the clock of the phase modulator with the clock of the laser comprises adding a delay to the phase of the compensated signal, before modulating the phase of the optical signal in response to the phase of the compensated signal.

7. The method of claim 1, further comprising transmitting the optical signal to a receiver via an optical cable, after modulating the phase of the optical signal.

8. The method of claim 7, further comprising recovering an input signal from the optical signal to generate an output signal.

9. The method of claim 8, further comprising performing non-linear compensation of the output signal.

10. The method of claim 1, further comprising transmitting the optical signal via an optical cable associated with a data center, after modulating the phase of the optical signal.

11. A method for chromatic dispersion pre-compensation in an optical communication network, comprising:
    distorting an original modulated signal according to an inverse of a transmission function of the optical communication network, to generate a compensated signal;
    modulating a magnitude of an optical signal in response to a magnitude of the compensated signal; and
    modulating a phase of the optical signal, after modulating the magnitude of the optical signal, in response to a phase of the compensated signal;
    wherein distorting the original modulated signal according to the inverse of the transmission function of the optical communication network comprises:
       dividing the original modulated signal into a plurality of blocks,
       adding leading and trailing zeros to each block,
       converting each block from a time domain to a frequency domain,
       after converting each block to the frequency domain, multiplying each block by the inverse of the transmission function of the optical communication network to obtain a respective frequency domain filtered block, converting each frequency domain filtered block to a time domain filtered block, and summing the time domain filtered blocks to obtain the compensated signal.

12. The method of claim 11, further comprising, before summing the time domain filtered blocks to obtain the compensated signal, partially overlapping adjacent time domain filtered blocks in the time domain.

13. The method of claim 12, wherein partially overlapping adjacent time domain filtered blocks in the time domain comprises overlapping adjacent time domain filtered blocks such that for each pair of immediately adjacent time domain filtered blocks, a portion of a first block of the pair associated with trailing zeros overlaps a portion of a second block of the pair associated with leading zeros.

14. The method of claim 11, further comprising transmitting the optical signal via an optical cable associated with a data center, after modulating the phase of the optical signal.

15. A transmitter system configured to perform chromatic dispersion pre-compensation, comprising:

a signal generator configured to distort an original modulated signal according to an inverse of a transmission function of an optical communication network, at least partially by applying the inverse of the transmission function of the optical communication network to a plurality of blocks derived from the original modulated signal, to generate a compensated signal;

a laser configured to modulate an amplitude of an optical signal in response to a magnitude of the compensated signal; and a phase modulator disposed downstream of the laser with respect to the optical signal, the phase modulator being configured to modulate a phase of the optical signal in response to a phase of the compensated signal.

16. The transmitter system of claim 15, further comprising a tunable delay line configured to add a delay to the phase of the compensated signal, before the phase modulator modulates the phase of the optical signal in response to the phase of the compensated signal.

17. The transmitter system of claim 15, wherein the laser comprises a directly-modulated laser (DML).

18. The transmitter system of claim 15, wherein the laser comprises a coherent optical injection locking (COIL) laser.

19. A transmitter system configured to perform chromatic dispersion pre-compensation, comprising:

a signal generator configured to distort an original modulated signal according to an inverse of a transmission function of an optical communication network, to generate a compensated signal;

a laser configured to modulate an amplitude of an optical signal in response to a magnitude of the compensated signal; and a phase modulator disposed downstream of the laser with respect to the optical signal, the phase modulator being configured to modulate a phase of the optical signal in response to a phase of the compensated signal;

wherein the signal generator is configured to distort the original modulated signal according to the inverse of the transmission function of the optical communication network by:

dividing the original modulated signal into a plurality of blocks, adding leading and trailing zeroes to each block, converting each block from a time domain to a frequency domain, after converting each block to the frequency domain, multiplying each block by the inverse of the transmission function of the optical communication network to obtain a respective frequency domain filtered block, converting each frequency domain filtered block to a time domain filtered block, and summing the time domain filtered blocks to obtain the compensated signal.

* * * * *